United States Patent [19]

Kuwabara et al.

[11] 4,423,428
[45] Dec. 27, 1983

[54] PENCIL HEAD FOR AUTOMATIC DRAWING INSTRUMENT

[76] Inventors: Shigeo Kuwabara, No. 334-6, Fukaya, Ayase City; Masanori Kamei, No. 937, Shobuzawa, Fujisawa City, both of Japan

[21] Appl. No.: 200,781

[22] Filed: Oct. 27, 1980

[30] Foreign Application Priority Data

Nov. 27, 1979 [JP] Japan .......................... 54-163195[U]
Nov. 27, 1979 [JP] Japan .......................... 54-163196[U]
Dec. 12, 1979 [JP] Japan ................................ 54-160332

[51] Int. Cl.³ ...................... G01D 15/16; B43L 13/00
[52] U.S. Cl. ................................. 346/139 C; 33/18 R
[58] Field of Search ..................... 346/139 C; 33/18 R

[56] References Cited

U.S. PATENT DOCUMENTS 3,939,482 2/1976 Cotter ............................. 346/139 C
3,971,036 7/1976 Gerber et al. .................... 346/139 C
4,015,269 3/1977 Edo ................................. 346/139 C

*Primary Examiner*—George H. Miller, Jr.
*Attorney, Agent, or Firm*—Phillips, Moore, Lempio & Finley

[57] ABSTRACT

A pencil head for automatic pencil drawing is provided with an up-and-down moving mechanism for one of pencil leads held on a periphery of a holding turret and a mounting mechanism for the holding turret, the up-and-down moving mechanism comprising a spring for raising a resilient member grasping the pencil lead which slides through a tubular holder fixed in the periphery of the holding turret and a pushing stick for pushing down the pencil lead, which is supported by a slider sliding along a rail, and the mounting mechanism comprising a coupler projected coaxially from the holding turret with a stair-stepped male cross-section and a socket for engaging and rotating the coupler with a slitted stair-stepped female cross-section corresponding to the stair-stepped male cross-section of the coupler. Accordingly, high fidelity and quick response of the pencil head used for automatic pencil drawing and shortening of time duration required therefor can be realized.

2 Claims, 6 Drawing Figures

PENCIL HEAD FOR AUTOMATIC DRAWING INSTRUMENT

BACKGROUND OF THE INVENTION (1) Field of the Invention

The present invention relates to a pencil head used for pencil-drawing in an automatic drawing instrument, particularly, to a pencil guide thereof used for guiding an up-and-down motion of a pencil.

(2) Description of the Prior Art

A typical example of a conventional pencil head used for a pencil drawing device mounted on an automatic drawing instrument is shown in FIG. 1. In this exemplified conventional pencil head, 1 denotes a holding turret for pencils, 2 denotes a gear, and 3 denotes a pinion, which is driven by a driving device (not shown) so as to enable the rotation of the holding turret 1 by rotating the gear 2 therewith. 4 denotes a pair of bearings, and 5 denotes one of a number of tubular members held in the holding turret 1 for guiding pencils therethrough respectively. The up-and-down motion of the tubular member 5 required for the pencil-drawing is effected by a spring 6 provided for raising it and a lowering mechanism consisting of a solenoid 7, an arm 8, a pin 9 and a spring 10 for lowering it.

For tightening the holding turret 1, an inserting hole 12a for inserting a pin 12 supported by a fixed bracket 14 is provided in a connecting member 11 which forms an upper part of the holding turret 1, and further another inserting hole 13a is provided in the connecting member 11 at right angles to the inserting hold 12a for inserting a cotter 13, which can be slid through a bearing metal 15 buried in the fixed bracket 14 and pushed forward by a spring 16, so as to pull up the connecting member 11 for tightening the holding turret 1. On the other hand, the release of the holding turret 1 from the pencil drawing device can be effected by drawing out the cotter 13 from the further pulled up connecting member 11.

18 denotes a pencil lead pushing stick employed as a medium for generating the pencil lead pressure, an upper end thereof being supported by clamps 20, 21 and a spring 22, which are provided on a bracket 19. 23 denotes a rack provided in parallel with the pencil lead pushing stick 18, an upper end thereof also being supported by the bracket 19. 24 and 25 denote a guide and a bearing metal respectively, which are fitted on a lower end of the rack 23. 26 denotes a pinion engaged with the rack 23. 27 denotes a motor accompanied with a detector and coupled with the pinion 26, by driving which motor 27 the rack 23 is lowered so as to apply the pencil lead pushing stick 18 with the pushing force required for causing the pencil lead pressure.

The above-mentioned conventional pencil head is arranged for moving the tubular member 5 up and down, so that the most external shape of the tubular member 5 is enlarged and the weight thereof is increased, and further the external shape of the upper part of the holding turret 1 is enlarged and the weight thereof is increased also. Moreover, the solenoid 7 and the motor provided for causing the pencil lead pressure co-operate with the timing matched with each other for moving the tubular member 5 up and down, so that the speed of the up-and-down motion is lowered and, as a result, the high speed drawing cannot be expected. Besides, the operation for mounting and releasing the holding turret 1 is troublesome and the mechanism therefor is complicated, and further the space between the holding turret 1 and the drawing surface 17 is apt to be varied, and, as a result thereof, the shift of drawn pictures and the break of the pencil lead accompanied with a long residual lead are caused easily during the drawing. Consequently, the conventional pencil head shown in FIG. 1 has such various kinds of defects as mentioned above.

On the other hand, another typical conventional pencil head employed for the pencil drawing device mounted on the automatic drawing instrument is arranged as shown in FIG. 2. In FIG. 2, 71 denotes a holding turret for holding pencil leads 72. 73 denotes a resilient member formed, for example, of rubber, 74 denotes a pencil lead guide, 75 denotes a tubular member, 76 denotes a spring and 77 denotes an enlarged portion of the tubular member 75. A number of holes (not shown) in which pencil lead guides 74 and tubular members 75 should be inserted individually are formed on the peripheral portion of the holding turret 71. FIG. 2 is a cross section showing one of those holes in which one the pencil lead guide 74 containing the resilient member 73 provided for holding the pencil lead 72 and the tubular member 75 connected to the pencil lead guide 74 are inserted, and further the spring 76 is fitted on the lower face of the enlarged portion 77 of the tubular member 75 as shown in FIG. 2. The up-and-down motion of the pencil guide during the drawing is effected by moving up and down the pencil lead 72, the resilient member 73 and the pencil lead guide 75 on the strength of the spring 76 and a pencil guide lowering device (not shown) which is provided externally.

In the above-mentioned arrangement, it is required for moving the tubular member 75 up and down smoothly that the tubular member is formed of a material having such a sufficient stiffness as bearable against an oscillating force generated by the up-and-down motion of the tubular member 75, and further the enlarged portion 77 of the tubular member 75 is indispensable for fitting the spring 76 on the periphery thereof. Accordingly, the most external shape of the pencil guide is inevitably enlarged as well as that of the holding turret 71 holding a number of those enlarged pencil guides on the peripheral portion thereof is enlarged also, and further the weight of the pencil guide cannot be reduced and the structure thereof is extremely complicated. Furthermore, the renewal at least of the resilient member 73, the pencil lead guide 74 and the tubular member 75 is necessitated by the defacement and the damage thereof caused by the secular change of the resilient member 73.

In addition thereto, in the conventional pencil-drawing device shown in FIG. 2, as mentioned earlier, the up-and-down motion of the pencil lead 72 during the drawing is effected by the pencil lead guide 74 containing the resilient member 73 which holds the pencil lead 72, the spring 76 provided for raising the pencil lead guide 74, the lowering device (not shown) provided with an arm 78 lowering the pencil lead guide 74 and a pencil-pressure device (not shown) provided with the pencil lead pushing stick 79 causing the pencil-pressure.

The up-and-down moving mechanism for pencil which is arranged as mentioned above has such a defect as the weight thereof is increased by a large number of parts thereof, so that the speed of the up-and-down motion of the pencil lead 72 and accordingly that of the drawing cannot be increased. Furthermore, for lowering the pencil lead during the drawing, the one-body member consisting of the resilient member 73 holding the pencil lead 72, the pencil lead guide 74 and the tubular member 75 is slid down through the hole formed on the peripheral portion of the holding turret 71 on the strength of the arm 78, and then the pencil lead 72 is pushed by the pencil lead pushing stick 79 so as to generate the pencil pressure. On the other hand, for raising the pencil lead during the drawing, the pencil lead pushing stick 79 is raised by the release of the arm 78, and then the one-body member consisting of the resilient member 73, the pencil lead guide 74 and the tubular member 75 is raised on the strength of the spring 76. Consequently, the up-and-down motion of the pencil lead 72 during the drawing is effected by the cooperation of the arm 78 and the pencil lead pushing stick 79 which is provided with a certain fixed time spacing between each other, so that the high fidelity and the quick response of the up-and-down motion of the pencil lead 72 and the shortening of the time duration required for the drawing cannot be realized.

SUMMARY OF THE INVENTION

An object of the present invention is to remove the above-mentioned various defects of the pencil head used for the automatic pencil drawing.

Another object of the present invention is to provide a pencil head having a few of small and light movable parts moving up and down during the pencil drawing effected by an automatic drawing instrument, so as to increase the speed of the pencil drawing.

Still another object of the present invention is to provide a pencil head having a pencil lead holding turret which has a simple structure and can be mounted and released easily.

Further another object of the present invention is to provide a pencil head having a pencil guide which has a simple structure and is scarcely required to renew movable parts thereof and further can be operated stably with the minimized length of residual pencil leads.

Still further another object of the present invention is to realize the high fidelity and the quick response of the pencil head used for the automatic pencil drawing and the shortening of the time duration required therefor.

The feature of the present invention is that, in a pencil head which is used for the automatic pencil drawing and which is provided with an up-and-down moving mechanism for a pencil lead held on a peripheral portion of a pencil lead holding turret and a mounting and releasing mechanism for the pencil lead holding turret, the up-and-down moving mechanism comprises a spring employed for raising a resilient member grasping the pencil lead which slides through a tubular pencil holder fixed in a hole formed on the peripheral portion of the pencil lead holding turret and a pencil lead pushing stick employed for pushing down the pencil lead, an upper end of which is supported by a slider being slid by a driving device along a guiding rod, and the mounting and releasing mechanism comprises a coupler which is projected coaxially from an upper face of the pencil lead holding turret and which has a stair-stepped male cross-section and is engaged with a nut having a divergingly tapered upper opening and a socket employed for engaging and rotating the coupler of the pencil lead holding turret on the strength of a driving device, which socket has a stair-stepped and slitted female cross-section and a convergingly tapered external shape in coincidence with the stair-stepped male cross-section and the divergingly tapered upper opening of the coupler, so as to secure the tight engagement between the coupler and the socket.

The present invention will be explained in greater detail, by way of example, with reference to the accompanied drawings hereinafter.

DESCRIPTION OF THE PREFERRED EMBODIMENTS

Figure 1:
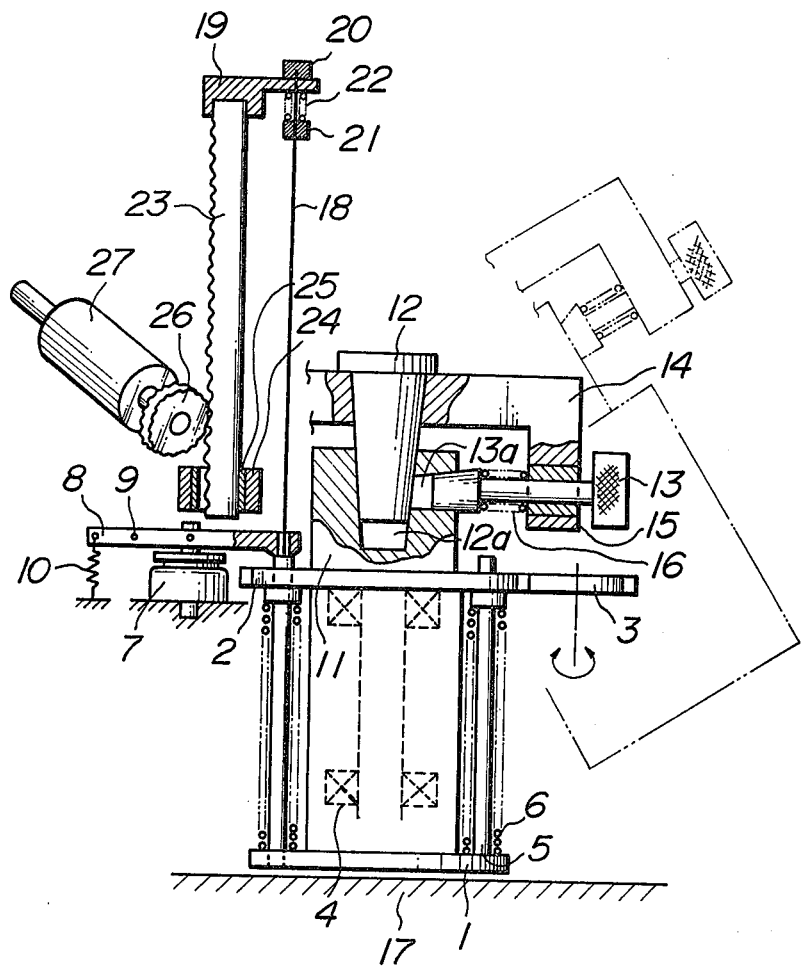
FIG. 1 is a partially cross-sectional side view showing a typical example of a conventional pencil head as mentioned above.

A preferred embodiment will be described by referring to a partially cross-sectional side view thereof shown in FIG. 3, and partially detailed cross-sections shown in FIGS. 4a and 4b, the former being a cross-section along an arrowed line A—A of the embodiment shown in FIG. 3 and the latter being a detailed cross-section corresponding to a portion surrounded by a broken circle B of the embodiment shown in FIG. 3. In the embodiment shown in FIGS. 3 and 4a, a number of tubular members 29 for holding pencil leads 28 respectively are formed individually of tubular members and are intered and fixed respectively in holes 30 formed on a peripheral portion of a holding turret 1'. Those holes 30 of the holding turret 1' are distributed equally on the periphery of the holding turret 1' and are finished individually with high precision. Recesses 29a formed respectively between every two of those plural tubular members 29 are engaged in order with a pair of rollers 33 which are fitted diametrically against the pencil lead holding turret 1' respectively at ends of a pair of arms 32 energized respectively by a pair of springs 31 so as to push the rollers 33 into the recesses 29a, until stopped by a pair of stoppers 34. As a result thereof, the positions of the tubular members 29 stopped as mentioned above are set up accurately.

On the other hand, regarding the up-and-down motion of pencil leads 28 held individually in those tubular members 29, a resilient member 35 inserted in the lower end portion of the hole 30 on the periphery of the pencil lead holding turret 1' and grasping the pencil lead 28 and a spring 6' fitted between the resilient member 35 and a pencil lead guide 36 fixed at the lower end of the hole 30 are provided for raising the pencil lead 28 together with the resilient member 35. Accordingly, the tubular member 29 and the pencil lead guide 36 are fixed in the hole 30 apart from the up-and-down moving system consisting at least of the resilient member 35 and the spring 6', so that the weight of the up-and-down moving parts can be reduced extremely in comparison with that of the conventional heads shown in FIGS. 1 and 2.

In addition thereto, the lowering of the pencil lead 28 is effected by a pencil pressure generating device comprising a pencil lead pushing stick 37. Accordingly, a driving mechanism for driving the pencil lead pushing stick 37 employed for causing the pencil lead 28 to generate the pencil pressure will be described by referring to FIG. 3 hereinafter.

Figure 3:
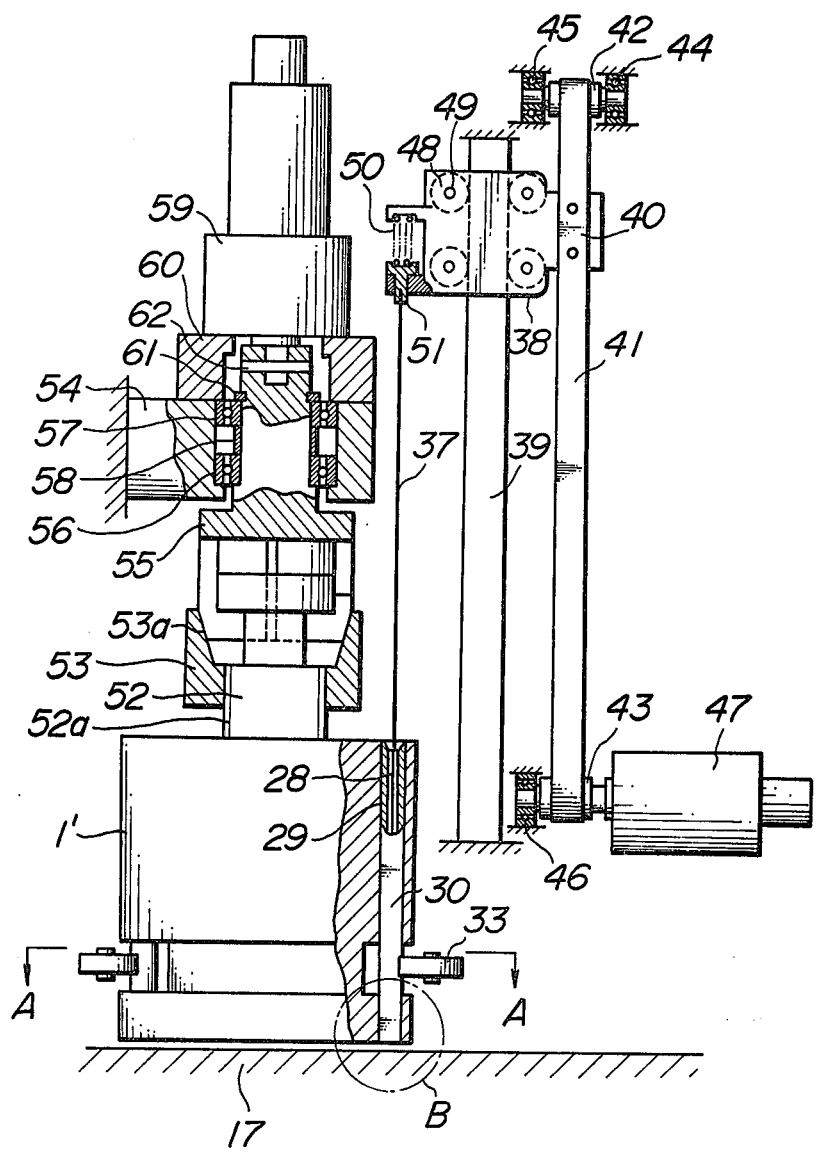
FIG. 3 is a partially cross-sectional side view showing an embodiment of a pencil head according to the present invention.
Figure 4A:
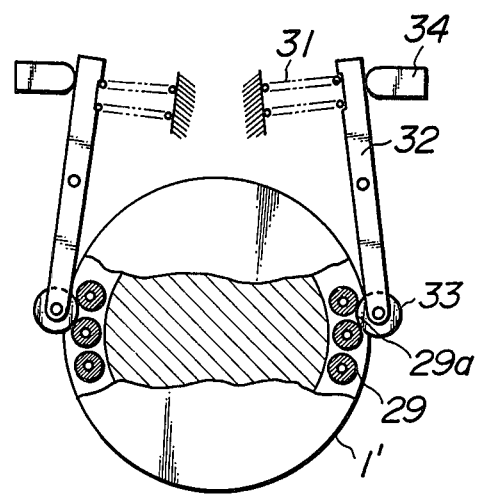
FIGS. 4a and 4b are a partially cross-sectional plan and a partial longitudinal cross-section respectively showing in detail the embodiment shown in FIG. 3 of the pencil head according to the present invention.
Figure 4B:
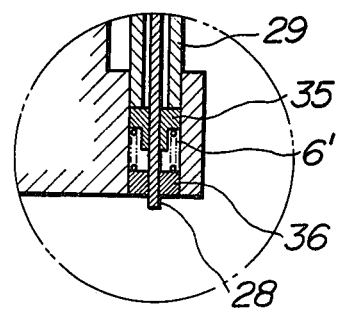

As shown in FIG. 3, an upper end of the pencil lead pushing stick 37 is supported by an end of a slider 38 which is slid on a guiding rod, for example, a rail 39. The rail 39 is disposed in parallel with the pencil lead pushing stick 37, both ends thereof being fixed by fixing members respectively. A clamp 40 formed on the other end of the slider 38 is engaged with a belt 41, which is suspended up and down by belt pulleys 42 and 43, the former being supported by bearings 44 and 45 and the latter being supported and driven by a bearing 46 and a driving motor 47 accompanied with a detector for detecting the condition of the pencil drawing and controlling the motor 47 according thereto, so as to move the slider 38 up and down through the belt 41. Two pairs of bearings 48 fitted on the slider 38 by pins 49 are provided for engaging the slider 38 with the rail 39 and facilitating the sliding thereon. A spring 50 and a spring shoe 51 provided on the end of the slider 38 are employed for supporting the upper end of the pencil lead pushing stick 37.

According to the structure as mentioned above, the slider 38 is slid on the rail 39 in response to the defacement of the pencil lead 28 by the shift of the belt 41 driven by the motor 47 which is controlled by the above-mentioned detector. In addition thereto, in the case that an additional supporter is provided on the middle portion of the pencil lead pushing stick 37, such an additional effect can be obtained that the pushing down force caused by the pencil lead pushing stick 37 can be surely delivered to the pencil lead 28.

Nextly, the mounting and releasing mechanism for the pencil lead holding turret 1' will be described in detail. A coupler 52 which is projected from an upper face of the pencil lead holding turret 1' has a stair-stepped male cross-section, a peripheral side wall of a basic step of which has a screwed face 52a. A nut 53, an inner face of which is divergingly tapered upwards so as to form a tapered upper opening 53a, is engaged with the screwed face 52a of the coupler 52. A socket 55, which has a stair-stepped female cross-section corresponding to the stair-stepped male cross-section of the coupler 52 and an external face of a top step of which is convergingly tapered downwards is supported by a bracket 54 secured on a fixed member. Bearings 56 and 57, which are spaced from each other by a spacer 58, are provided between the bracket 54 and a shaft of the socket 55, so as to facilitate the rotation of the socket 55 coupled with the pencil lead holding turret 1' through the coupler 52 on the strength of a driving motor 59 which is coupled with the shaft of the socket 55 by a bracket 60, a snap ring 61 and a pin 62. The stair-stepped female cross-section of the socket 55 is slitted in a direction parallel to a rotation axis of the pencil lead holding turret 1', so as to secure the tight engagement between those male and female stair-stepped cross-sections. After the coupling of those cross-sections between the coupler 52 and the socket 55, the slitted stair-stepped female cross-section tightens the stair-stepped male cross-section inserted therein on the strength of the shift between the inner and external tapered faces of the coupler 52 and the socket 55, which shift is caused by the rotation of the nut 53. As a result thereof, the coupler 52 and the socket 55 are tightly engaged with each other. Consequently, the mounting and releasing of the pencil lead holding turret 1' can be simply and easily carried out only by the rotation of the nut 53.

Nextly, another embodiment of the present invention will be described in detail by referring to FIG. 5.

Figure 5:
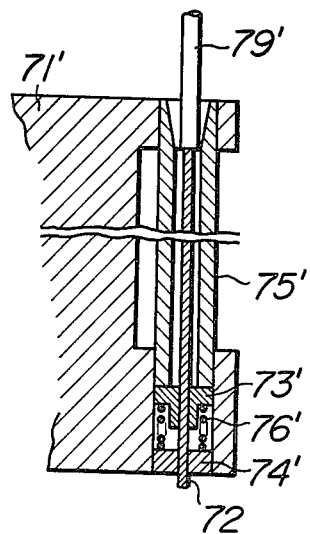
FIG. 5 is a partial longitudinal cross-section showing in detail a part of another embodiment of the pencil head according to the present invention.

In FIG. 5, 71' denotes a pencil lead holding turret, on a peripheral portion of which a number of inserting holes are formed. Those holes are individually provided with recesses for securing the positions of the turret 71' as mentioned earlier. Only one of those holes is shown in FIG. 5. 72 denotes a pencil lead, and 73' denotes a resilient member for grasping the pencil lead 72, which member is inserted in a lower end portion of the inserting hole. 74' denotes a pencil lead guide, which is fixed in a bottom of the inserting hole. 76' denotes a spring which is inserted between the resilient member 73' and the pencil lead guide 74' for pushing up the resilient member 73' together with the pencil lead 72. 75' denotes a tubular member which is fixed in middle and upper portions of the inserting hole for sliding the pencil lead 72 therethrough. So that, the tubular member 75' is apart from the up-and-down motion of the pencil lead 72 during the pencil drawing.

In the above structure of the pencil head, the tubular member 75' can be formed of a thin tubular member having an inner diameter sufficient enough for the pencil lead 72 to slide therethrough, so that the tubular pencil lead holding member according to the present invention is not required at all to have such a sufficient stiffness as mentioned earlier regarding the conventional pencil head. In the pencil head according to the present invention, as shown in FIG. 5, the resilient member 73' inserted in the inserting hole below the fixed tubular member 75' so as to grasp the pencil lead 72 and the spring 76' inserted between the resilient member 73' and the fixed pencil lead guide 74' used together for a cap of the inserting hole and a shoe of the spring 76' are employed for the up-and-down moving mechanism of the pencil lead 72 together with an external pencil lead lowering device (not shown).

Figure 2:
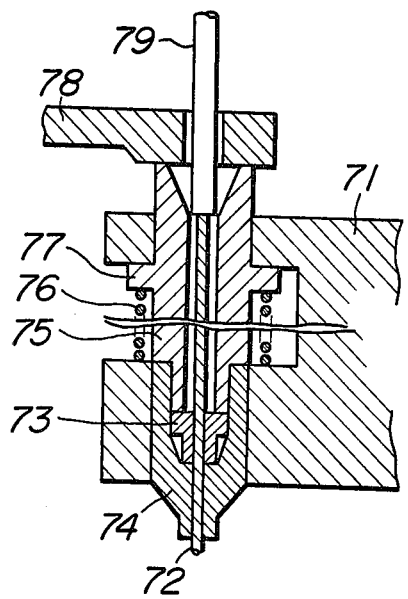
FIG. 2 is a cross-section showing a part of another typical example of the conventional pencil head as mentioned above.

According to the above mentioned structure of the pencil head, the diameter of the tubular member 75' can be reduced extremely in comparison with that shown in FIG. 2, and as a result, the diameter of the pencil lead holding turret 71' on the periphery of which a number of those tubular pencil lead holding members are distributed equally can be reduced sufficiently for the weight thereof to be reduced remarkably. Moreover, according to the separation of the pencil lead guide 74' and the tubular member 75' from the up-and-down moving system for the pencil lead 72, the weight of the up-and-down moving system can be extremely reduced, so that it is possible to employ the spring 76' which has an elasticity weaker than that of the resilient member 73' for raising the pencil lead 72, and, as a result, it is possible also to utilize a part of the pencil pressure for lowering the pencil lead 72.

In addition thereto, in the embodiment shown in FIG. 5, the structure of the pencil guide is simplified remarkably in comparison with that of the conventional pencil guide, and the renewal only of the resilient member 73' is enough against the defacement and the damage of the resilient member 73' caused by the secular change thereof, so that the renewal of the other parts, which cannot be avoided in the conventional pencil head, is not required at all, and, as a result, the cost for the maintenance thereof can be reduced markedly.

Furthermore, according to the present invention, the resilient member 73' for grasping the pencil lead 72 is disposed lower than that in the conventional pencil head shown in FIG. 2, so that the residual length of the pencil lead 72 can be reduced as well as the amount of the figures drawn with one pencil lead can be increased in comparison with that in the conventional pencil head.

Moreover, according to the present invention, the numbers of parts and manufacturing processes can be reduced markedly, as well as the complicated cooperation accompanied with a certain fixed time delay between the arm 78 and the pencil lead pushing stick 79, which is required for the conventional structure shown in FIG. 2, is dispensable, and the pencil lead 72 can be moved up and down only by the action of the pencil lead pushing stick 79', so that the high fidelity and the quick response of the pencil drawing can be realized without the accompanied break of the pencil lead in the tubular holder 75'. Consequently, the remarkable effects in practical use can be obtained according to the present invention, as well as the performance of pencil drawing can be improved extremely.

What is claimed is:

1. A pencil head for an automatic drawing instrument wherein a plurality of pencil leads are employed as media for drawing, comprising:
   a pencil head,
   a rotatable pencil lead holding turret,
   means for releasably mounting said turret on said head,
   a plurality of vertical tubular members mounted on said turret, said tubular members being parallel to each other and each adapted to receive a pencil lead therein,
   a plurality of resilient members carried by said turret, there being one resilient member for each tubular member, each resilient member being below the tubular member with which it is associated and being mounted in the turret for limited up-and-down movement, each resilient member having a vertical hole therethrough for grasping a pencil lead extending down through said hole,
   means for individually, directly, and resiliently biasing each of said resilient members upwardly,
   a rotating means,
   an engagement means for engaging said rotating means with said turret for rotation of said turret by said rotating means to selectively dispose one of said tubular members at a drawing position,
   a pencil lead pushing means disposed for up-and-down movement in the tubular member at said drawing position,
   a driving means for moving said pencil lead pushing means downwardly in the tubular member at said drawing position to impose a downward pressure on a pencil lead in said tubular member and for moving said pencil lead pushing means upwardly in said tubular member to relieve said downward pressure.

2. A pencil head for an automatic drawing instrument as claimed in claim 1, wherein said engagement means includes
   a coupling means which is projected coaxially from an upper face of said pencil lead holding turret and has a stair-stepped male cross-section, and
   a socket means which is connected to said rotating means and has a stair-stepped female cross-section corresponding to said stair-stepped male cross-section.

* * * * *

UNITED STATES PATENT AND TRADEMARK OFFICE
CERTIFICATE OF CORRECTION

PATENT NO. : 4,423,428
DATED : December 27, 1983
INVENTOR(S) : Shigeo Kuwabara and Masanori Kamei It is certified that error appears in the above-identified patent and that said Letters Patent is hereby corrected as shown below:

On the cover page, left-hand column, after the inventors' names, add

--[73] Assignee: Toyo Denki Seizo Kabushiki Kaisha, Tokyo, Japan--

Signed and Sealed this

Thirteenth Day of November 1984

[SEAL]

Attest:

GERALD J. MOSSINGHOFF

Attesting Officer  Commissioner of Patents and Trademarks